Aug. 3, 1965  J. F. MIFSUD  3,198,281
SEISMIC METHOD OF PROSPECTING
Filed Aug. 8, 1960  5 Sheets-Sheet 1

Joseph F. Mifsud  Inventor

By John D. Dassett  Attorney

Aug. 3, 1965    J. F. MIFSUD    3,198,281
SEISMIC METHOD OF PROSPECTING
Filed Aug. 8, 1960    5 Sheets-Sheet 4

Joseph F. Mifsud    Inventor
By John D. Gassett    Attorney

United States Patent Office 3,198,281
Patented Aug. 3, 1965

3,198,281
SEISMIC METHOD OF PROSPECTING
Joseph F. Mifsud, Tulsa, Okla., assignor, by mesne assignments, to Esso Production Research Company, Houston, Tex., a corporation of Delaware
Filed Aug. 8, 1960, Ser. No. 48,157
9 Claims. (Cl. 181—0.5)

This invention relates to an improved method of seismic surveying. It relates particularly to a system of seismic surveying using a vibrator near the surface of the ground.

In seismic prospecting, seismic energy is initiated at or adjacent the surface of the earth. The seismic energy produces or causes elastic waves which are transmitted through the earth. At least a portion of these waves are directed downward through the earth and are reflected from different strata of the earth due to discontinuities or variations of structure. By placing geophones or seismic pickups on or adjacent the surface of the earth at points displaced from the origin of the seismic energy, the arrival of the reflected waves at the earth's surface may be detected. The geophones convert the detected waves into electrical impulses which are then amplified and recorded by means of a seismograph, for example. The record may be phonographically reproducible such as recorded on magnetic tape and then subsequently analyzed by various manners of visual presentation such as wiggly trace, variable density presentation, etc. In one seismograph record (also called a seismogram) a plurality of traces are arranged in parallel relation each representative of the output from an individual geophone or geophone station. The record is provided with a suitable timing mark so that when the seismogram is later examined, the time required for seismic energy to travel downward through the earth and to be reflected back to the geophone may be determined. This general method of seismic prospecting permits the determination of valuable geological information particularly useful, for example, in the exploration for petroleum.

One difficulty in using seismic prospecting methods is that of analyzing the seismic records obtained. The records are of such a nature due to the complexity of the elastic waves set up and transmitted in the earth and due to the multiplicity of reflecting discontinuities in the earth, etc., that frequently interpretation of seismic records are extremely difficult.

This invention relates to an improvement of the so-called heterodyne method of seismic prospecting. Seismic energy is transmitted to the earth in the form of a frequency modulated wave whose frequency sweep is linear with time. A reflected signal is detected by beating the received signal, detected by geophones or other seismic transducers, with the transmitted wave. The difference frequency obtained by the beating operation is proportional to the depth of a reflecting horizon. The resolution of this method is proportional to $$\frac{T_1 F_1}{f_2 - f_1}$$

in which $f_2 - f_1$ is equal to the band width of the transmitted signal; $T_1$ is the length of the transmitted signal in time and $F_1$ is the band width of the filter that detects the difference frequency between the transmitted signal and the received signal.

In accordance with this invention, the resolution is improved by decreasing the duration of the time, $T_1$ of the transmitted signal. An oscillator means having the same initial frequency as the viibration signal and the same rate of change of frequency is used. However, the frequency sweep of the oscillator means extends beyond that of the vibrator means. The signal from the oscillator means is multiplied by the received signal. One of the results of this product is a signal with a difference frequency. The difference frequency, i.e. the frequency of the oscillator minus the frequency of the received signal is an indication of the occurrence and the depth of a reflecting event.

Objects of and a better and more complete understanding of the invention may be had from the following description taken in conjunction with the drawing in which.

Figure 1:
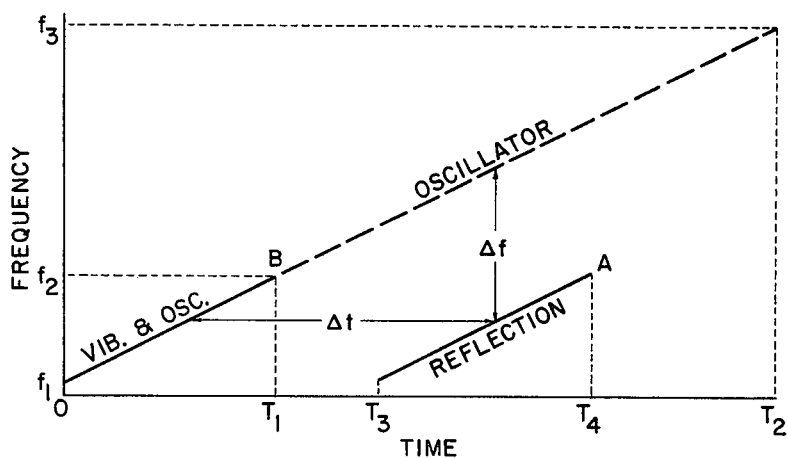
FIG. 1 is a chart showing the relationship between frequency and time with frequency increasing linearly with time.

Referring now to FIG. 1, there is shown a graph with the ordinate representing frequency and the abscissa representing time. Illustrated thereon is a reflection event A beginning at time $T_3$ and parallel to the frequency curve B of a vibrator and oscillator. At zero time a vibrator and an oscillator each have a frequency of $f_1$. At time $T_1$ both the oscillator and the seismic vibrator have reached a frequency of $f_2$. At this point, the seismic vibrator is stopped but the oscillator continues on in a straight line rise until it has reached a frequency of $f_3$ at time $T_2$. A separate oscillator whose frequency changes at the same rate as the vibrator may be used to generate a signal to beat with the reflected signal.

At time $T_3$ reflection A from a subsurface discontinuity is detected at the surface by geophones. This reflection A is for the same duration as the original transmitted signal; that is, $T_4 - T_3$ is equal to $T_1$. The frequency of reflection A at $T_3$ is approximately equal to $f_1$ and the frequency at $T_4$ is approximately equal to $f_2$.

It is assumed that the frequency modulated signal generated by the oscillator is:

(1) $\qquad A \sin 2\pi (a+bt)t$ where $a =$ initial frequency,
$2b =$ rate of change of frequency,
$A =$ the maximum amplitude of the signal, and
$t =$ time.

The elastic valve generated at a time $t_1$ is:

(2) $\qquad A_1 \sin 2\pi (a+bt_1)t_1$

The elastic wave is reflected from some geologic horizon and arrives back at the surface of the ground $\Delta t$ later. Hence, $\Delta t$ represents the total travel time of the seismic wave. With the substitution $t_1 = t - \Delta t$ the product of Equations 1 and 2 is:

(3)

$$\frac{AA_1}{2} \cos 2\pi[a + b(2t - \Delta t)]\Delta t -$$

$$\frac{AA_1}{2} \cos 2\pi[a(2t - \Delta t) + b(2t^2 - 2t\Delta t + \Delta t^2)]$$

It is thus seen that by multiplying the curve representative of reflection A and the oscillator curve that a signal is obtained having two side bands in which one has the frequency of $2b\Delta t$ and the other has a frequency that increases at the rate $4b$. By proper filtering, a signal having a frequency of $2b\Delta t$ can be obtained. This is represented by $\Delta f$ in FIG. 1. Therefore this difference in frequency is proportional to the depth of a reflecting horizon.

The resolution of this method is equal to $$1/2C \frac{T_1 F_1}{f_2 - f_1}$$

Figure 2:
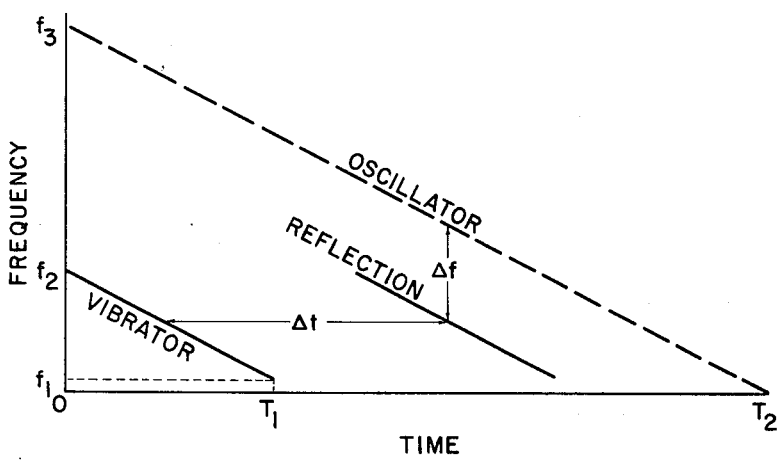
FIG. 2 illustrates a relationship between frequency and time with frequency linearly decreasing with time.

By decreasing the duration $T_1$ of the transmitted signal, the resolution is improved and the dynamic range required of the receiving system is reduced. For example, assume in FIG. 1 that $T_1$ is 1.8 seconds; $T_2$ is 6 seconds; $f_1$ is 10 cycles per second; $f_2$ is 100 cycles per second and $f_3$ is 310 cycles per second. For good signal-to-noise ratio, the bandwidth $F_1$ of the receiving filter is approximately equal to the reciprocal of $T_1$. For an average seismic wave velocity C of 10,000 ft./sec., it is seen that the resolution is about 55 feet; that is, a bed only 55 feet thick can be accurately detected without confusion of the adjacent beds. In FIG. 1 and FIG. 2 the difference freqency $\Delta f$ is respectively directly and inversely proportional to the delay time $\Delta t$ of a reflected signal.

In the usual application of the heterodyne detection method the difference frequency between the received signal and the transmitted signal is obtained. This means that the duration of the vibrator signal must be twice the travel time for the elastic wave to reach the deepest reflection horizon of interest, plus the time necessary for the detection filter to reach maximum amplitude. If a reflection from a depth of 10,000 feet is desired, and an average velocity of 10,000 ft./sec. is assumed, then the total travel time for the elastic wave is about 2 seconds. If the frequency excursion of the transmitted wave $f_2 - f_1$, and the bandwidth of the detection filter $F_1$ are the same as in the example in the preceding paragraph, then the transmitted signal would have to be at least 3.8 seconds long in order for the output of the detection filter to reach maximum output for the deepest reflection signal. This gives a resolution of about 117 feet. In the example of the present invention the resolution is 55 feet which is a considerable improvement, especially valuable for detecting thin beds.

If an elastic wave is generated that lasts two to several seconds, then the dynamic range of the receiving system must be larger than that required of the conventional seismic exploration method that ordinarily uses dynamite as the acoustic source. With a dynamite source, a long duration reflected signal usually is not over about 0.1 second long. A small dynamic range is thus required. However, when the transmitted signal is two seconds or more in duration, reflections from a large number of horizons at different depths will be arriving at the receiving geophones simultaneously. Then a large dynamic range is required. In the system disclosed herein the transmitted signal is easily made shorter than that used in the conventional heterodyne seismic detection method. Hence, the dynamic range required of the receiving system is less when used with the presently disclosed system.

Figure 3:
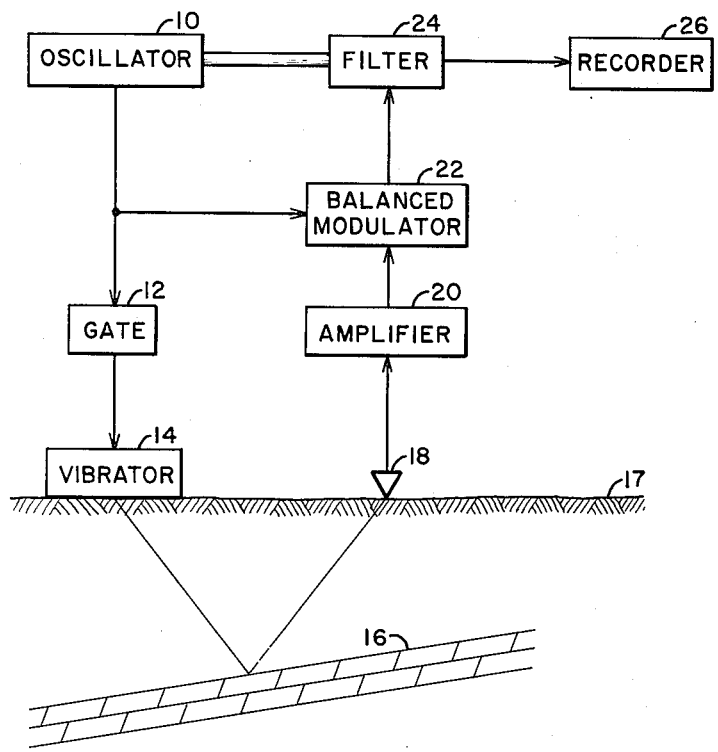
FIG. 3 illustrates a field recording system.

Turning now to FIG. 3, there is illustrated in block diagram form the best mode contemplated for recording seismic information in accordance with this invention. Numeral 10 represents an oscillator which is preferably of a character to generate a sinusoidal waveform whose frequency increases linearly with time. The output of oscillator 10 is passed through gate 12 to vibrator 14. Vibrator 14 is of a character to transmit seismic or elastic wave energy to the ground whose frequency varies linearly from an initial frequency $f_1$ to a final frequency $f_2$. Vibrator 14 can conveniently be of a character to follow the signal from oscillator 10 fed through gate 12, such a vibrator could be a vertically rotating eccentric flywheel driven in synchronism with oscillator 10. Gate 12 is of a character to shut off vibrator 14 when the frequency of the output of oscillator 10 reaches a predetermined value $f_2$. Gate 12 can conveniently be a mechanical linkage connecting, for example, the dial of the oscillator and the input control signal to the vibrator. When the oscillator reaches a predetermined frequency the vibrator is cut off. A suitable vibrator, designated Model Number HC–250–18, is manufactured by M. B. Electronics, a division of Textron Electronics, Incorporated, 781 Whalley Avenue, New Haven 11, Connecticut.

The seismic wave generated by vibrator 14 is transmitted through the earth and reflected from discontinuity 16, for example, to the earth's surface 17 where it is detected by geophone 18. Geophone 18 may be any transducer capable of detecting movement of the earth and converting such movement to an electrical signal and may include an array of geophones forming a geophone station. The output of geophone 18 is fed through amplifier 20 to a balanced modulator 22 as the modulating signal. The output from oscillator 10 is also fed to balanced modulator 22 and is fed as the carrier signal. Balanced modulator 22 is of a character that its output is the product of the modulating signal and the carrier. This product is equivalent to the sum of two new signals; i.e. one of these signals being of a frequency that is the sum of the modulating and carrier frequencies, and the second signal being of a frequency that is the difference of the carrier and modulating frequency. Specifically, balanced modulator 22 may be a pair of triodes having a carrier signal and a modulating signal driving each grid but the second grid signal is 180° out of phase from the first grid signal. Therefore, after modulation takes place the output contains the two side bands without the carrier or the modulating signal.

The output from balanced modulator 22 is fed to filter 24. It is desired that filter 24 pass the difference frequency therethrough and block the sum frequencies. This can conveniently be done by giving filter 24 a cutoff frequency at $f_1 + \alpha t$ which represents the frequency of oscillator 10. A mechanical linkage is made from the dial of oscillator 10 to the dial of filter 24 to continuously adjust the low frequency cutoff of filter 24 in a known manner. A suitable filter 24 is Krohn-Hite Model 350–A, manufactured by Krohn-Hite Instrument Company of Cambridge, Massachusetts. The output of filter 24 which contains the difference frequencies is then fed to and recorded by recorder means 26. Recorder 26 may conveniently be magnetic tape from which the difference frequency signal can readily be reproduced.

Figure 4:
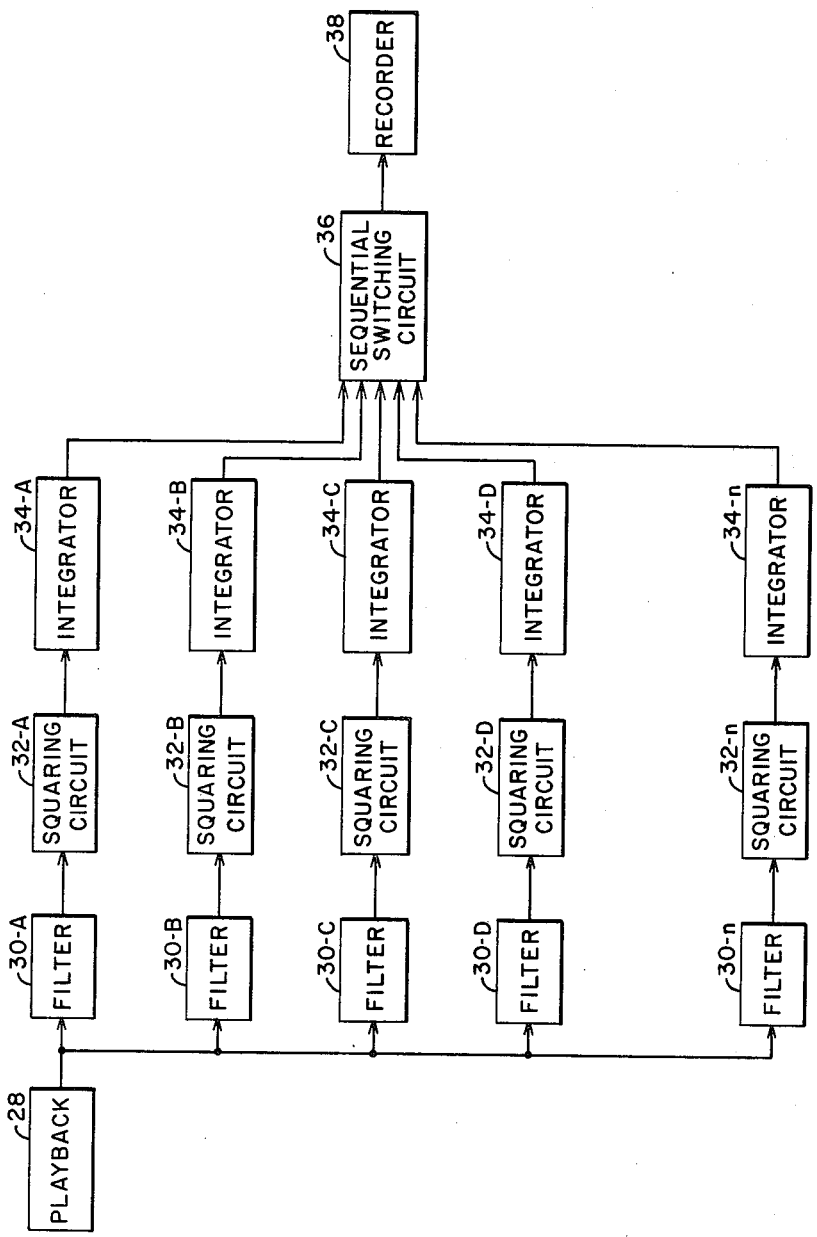
FIG. 4 illustrates a processing system of the field records.

Turning now to FIG. 4, there is illustrated an embodiment for processing the record made in FIG. 3. The record recorded on recorder 26 is reproduced by playback or reproducing means 28. The output of playback unit 28 is connected to a plurality of filters 30–A to 30–n. It is, of course, understood that the output of filter 24 could be fed directly to filters 30–A through 30–n. However, in operation the signal is normally recorded on recorder 26 in field operation, then the record recorded on 26 will be processed in a processing office on the embodiment shown in FIG. 4.

In order to improve resolution, the filters 30–A to 30–n are rather sharp. For good signal-to-noise ratio, it is preferred that they be tuned to a bandwidth in cycles per second which is approximately equal to the reciprocal of the duration in seconds of the seismic signal. For example, if $T_1$ shown in FIG. 1 is approximately 1.8 seconds, then the bandpass of the filters is desirably about 0.5 cycle per second. The filters are preferably equally spaced; that is, 30–A is for 0.5 cycle per second; 30–B is for 1.0 cycles per second; filter 30–C is 1.5 cycles per second, etc. It is, of course, understood that $\Delta f$ is not always important in the lower range as it indicates shallow reflections which are not always of importance. Therefore, the filters for the lower frequencies near 30–A, which in reality are filters for $\Delta f$ of the shallower reflections, may be spaced farther apart than the deeper reflections. If this is the case, this will have to be taken into account in the multiplexing system or a sequential switching circuit as will be seen. The number of filters which are required may vary; however, in general it can be said that enough filters should be available to obtain the deepest reflections of interest. The deepest reflections would be represented by a difference frequency $\Delta f$ of $f_3-f_2$ which in the example shown in FIG. 1 is 310 cycles per second minus 100 cycles per second which is 210 cycles per second. Therefore, filter 30–$n$ should be set at 210 cycles per second.

The output of filters 30–A through 30–$n$ are fed respectively to squaring circuits 32–A to 32–$n$ as shown in FIG. 4 or to full wave rectifying circuits. Either approach will give an output which when summed over time is indicative of the total amount of a particular frequency in the received $\Delta f$ signal. A squaring circuit which could be used is a push-pull squaring circuit described on page 683 of "Waveforms" of the Radiation Laboratory Series. The output of squaring circuits 32–A to 32–$n$ are fed to integrators 34–A to 34–$n$, respectively. These integrators integrate the area of the waveform from their respective squaring circuits. The output of integrators 34–A to 34–$n$ are fed to recorder 38 through a sequential switching circuit or multiplexing system 36. This sequential switching circuit samples the integrated output of the integrators 34–A to 34–$n$ in sequence and stores this information in recorder 38 preferably on magnetic tape. A simple sequential switching circuit includes a rotating commutating switch where the commutator is mechanically connected to the playback drum and each terminal of the switch is connected to the output of an integrator. An electronic sequential switching circuit is also used as a switching means. The outputs of the integrators are sampled at the proper time, i.e. at the end of $\Delta t$ corresponding to $\Delta f$ plus the response time of the filter to which the integrator is in series therewith. The integrators are reset after each trace of the magnetic record is processed. This can be done by grounding the outputs of the integrators.

Figure 6:
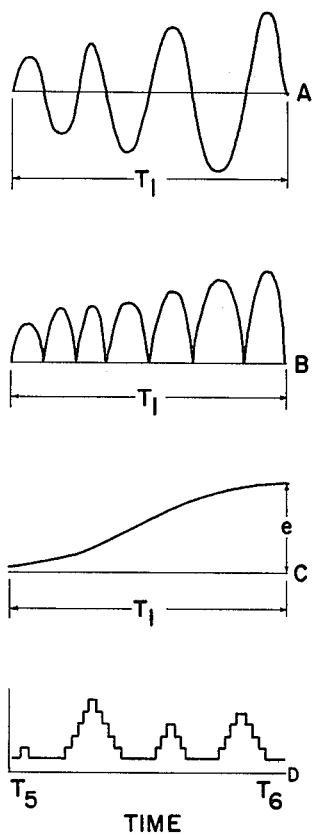
FIG. 6 illustrates waveforms occurring at various points in the system illustrated in FIG. 4.

In FIG. 6, waveform A represents a typical curve of the waveform passing through filter 30–A. The duration of this difference frequency $\Delta f$ is essentially for the time $T_1$ of the generated seismic wave as illustrated in FIG. 1. Waveform B of FIG. 6 represents the output of squaring circuit 32–A. Waveform C represents the output of the integrator 34–A. At the end of $T_1$ time, waveform C has reached a value or amplitude of $e$. It is this value $e$ which the sequential switch 36 passes to recorder 38 until it samples or taps the output from integrator 34–B or the next succeeding integrator. The voltage $e$ is held for a duration of time equal to the time represented between two succeeding filters as, for example, 30–A and 30–B, etc. If desired a sample and hold circuit means can be used between sequential switching circuit 36 and recorder 38. The signal received by recorder 38 may be displayed in any manner desired. A typical waveform of a part of the signal recorded by recorder 38 is shown as curve D in FIG. 6. Also a plurality of such signals may be displayed in a side-by-side relationship with proper seismic corrections applied to produce a seismic section.

Figure 5:
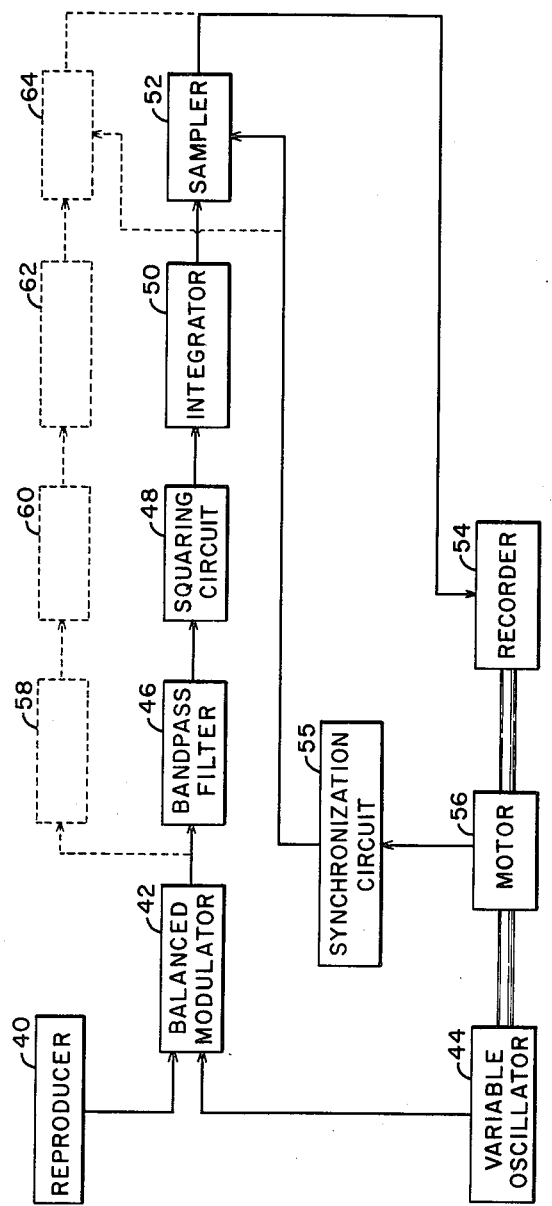
FIG. 5 illustrates another processing system of field records.

Attention is now directed to FIG. 5 which shows an alternate processing system. Shown thereon is reproducing means 40 which may be similar to reproducing means 28. The output of reproducing means 40 is fed to balanced modulator 42. Also electrically connected to balanced modulator 42 is the output of variable oscillator means 44. The output of balanced modulator 42 is fed to sharp bandpass filter 46 which in turn is electrically connected to squaring circuit 48 whose output is likewise connected to integrator 50. The output of integrator 50 is fed to sampler means 52 whose output is recorded on recorder 54. A motor 56 is coupled to and drives recorder 54 and variable oscillator 44. There is a synchronizing circuit means 55 which connects motor 56 to sampler 52.

Sampler 52 samples and holds the voltage value of the output of integrator 50 upon command from synchronization circuit 55. Bandpass filter 46 has the same center bandpass frequency as the initial frequency of variable oscillator 44. If, for example, it is decided that bandpass filter 46 should have a peak response at 500 cycles per second then variable oscillator 44 would have a frequency of 500 c.p.s. initially. The oscillator maintains the same frequency for a time equal to the total travel time of the seismic wave plus the response time of the filter. If $T_1$ the duration of the seismic input signal, is approximately 1.8 seconds as discussed above in relation to FIG. 1, then the frequency of variable oscillator 44 is $$500+(n-1)$$

0.5 c.p.s. in which $n$ is either revolutions of recorder 54 or the number of times the particular signal being processed is reproduced from reproducing means 40.

To illustrate how the system in FIG. 5 operates, assume that there is a reflection having a difference frequency of 10 c.p.s. recorded on, and is reproduced from, reproducing means 40. This signal would pass through filter 46 when $n$ equals 21. This is because the main signal being fed to balanced modulator 42 from reproducing means 40 has a frequency of 10 and the second signal being fed to balanced modulator 42 from variable oscillator 44 has a frequency of 500+20 (.5) or 510. The difference frequency between 510 and 10 is 500. The information representing the 10 cycles per second event recorded on recording means 26 then is passed through filter 46. It is then squared in squaring circuit 48 and passed to integrator 50 which integrates the signal fed thereto from squaring circuit 48. Sampler 52 samples the maximum integrated signal and records it on recorder 54 at the proper delay time. The proper delay time is the total travel time of the seismic wave plus the response time of the filter. The total travel time of the seismic wave is equal to $\Delta f$, the frequency of the particular filter operation divided by the rate of frequency sweep of the oscillator driving the vibrator; i.e.

$$\frac{\Delta f}{\Delta f/\Delta t}$$

which in the example of FIG. 1 would be $$\frac{(n-1)0.5}{50}=(n-1)10^{-2} \text{ seconds}$$

Synchronization circuit 54 connecting the motor and sampler 52, directs the signal in the sampler to be recorded at the right time. The record is reproduced until all the desired difference frequencies have been detected and recorded.

If desired, additional rows of filter squaring circuits, integrators and samplers can be added as illustrated by dotted lines showing filter 58, squaring circuit 60 and sampler 64. In the example given in which filter 46 passes a frequency of 500 c.p.s. and $T_1$ is 1.8 seconds then the center frequency of filter 58 could be, for instance, 499.5 c.p.s. With this arrangement the frequency of variable oscillator 44 is 500+($n-1$) c.p.s. Thus the seismic record need be played back, by reproducing means 40 half as many times when two filters, etc. are used.

Various modifications may be made to the apparatus or system disclosed in this operation. For example, in FIG. 1 it was illustrated that the frequency of the oscillator increased linearly with time. The device would also operate well with the oscillator decreasing linearly with respect to time as illustrated in FIG. 2. In that figure, the frequency of the oscillator decreases from $f_3$ which, for example, is 310 cycles per second at time zero to $f_1$ or 10 cycles per second in time $T_2$. The vibrator likewise decreases linearly in frequency beginning with the frequency $f_2$ at time equals zero and decreasing linearly to frequency $f_1$ at $T_1$. $\Delta t$ is shown in FIG. 2 as the difference in time between the occurrence of the vibrator signal and the detected reflected signal. $\Delta f$ is the difference between the oscillator frequency and the reflection frequency. In FIG. 2 the difference frequency $\Delta f$ is inversely proportional to the delay time $\Delta t$ of the reflected signal.

While there are above disclosed but a limited number of embodiments of the system of the invention herein presented, it is possible to produce still other embodiments without departing from the inventive concept herein disclosed, and it is desired therefore that only such limitations be imposed on the appending claims as are stated therein, or required by the prior art.

What is claimed is:

1. A system for use in seismic prospecting which comprises in combination: an oscillator whose frequency of oscillation is given by $f_1+\alpha t$ in which $f_1$ is initial frequency, $t$ is time and $\alpha$ is the rate of change of the frequency with respect to time; a vibrator for imparting continuous wave vibrations to the ground whose frequency varies from $f_1$ to $f_2$ linearly the same as frequency of said oscillator; a seismic transducer means to detect reflections at the surface of the earth of the vibration from said vibrator; beating means to beat the output of said oscillator with the output of said transducer; first filtering means connected to said beating means to obtain a signal whose frequency is the difference between a signal from said oscillator and a signal from haid transducer means; recording means to record the output of said first filtering means; a plurality of second filter means in parallel and varying in frequencies over the range of interest of said difference frequencies, each said filter means being connected to the output of said recording means; a squaring circuit for and connected to the output of each said filter means; integrator means for and electrically connected to the output of each said squaring circuit; a multiplexing system electrically connected to the output of said integrators, said multiplexing system being of a character to sample the integrated output of said integrators in sequence from the filter of lowest frequency bandpass sequentially to the filter of high frequency bandpass; and means electrically connected to the multiplexing system to record the sampled outputs.

2. A system as defined in claim 1 in which the bandpass width of each filter of the plurality of second filter means is approximately the reciprocal of the duration of the continuous wave vibrations of said vibrator.

3. An apparatus for recording seismic signals comprising in combination: an oscillator whose frequency of oscillation is given by $f_1+\alpha t$ in which $f_1$ is the initial frequency, $t$ is time and $\alpha$ is $\Delta f/\Delta t$; a vibrator for imparting continuous wave vibrations to the ground whose frequency varies from $f_1$ to $f_2$ varying linearly the same as the frequency of said oscillator; a seismic transducer means to detect reflections of the vibrations from said vibrator; a balanced modulator in which the oscillator is connected as a carrier frequency thereto and said transducers are electrically connected in a manner to supply the modulating frequency to said balanced modulator, the output of said balanced modulator containing frequencies of the sum of the oscillating and modulating frequencies and the difference of such; a filter means electrically connected to the output of said balanced modulator; control means for said filter means such that the cutoff frequency of said filter means is $f_1+\alpha t$; and recording means electrically connected to the output of said filter means.

4. A system for processing a seismic signal from a reproduced seismic source using a reproducing means which comprises in combination: a motor; a drum type recorder driven by said motor; a balanced modulator; a bandpass filter electrically connected to the output of said balanced modulator, said bandpass filter having a bandpass of $\phi$ cycles per second; a variable oscillator driven by said motor whose frequency is $m+(n-1)\phi$ where $m$ is a selected initial frequency, $n$ is the number of revolutions of said recorder, and $\phi$ is the band width of said filter; first means electrically connecting the output of said reproducing means and second means electrically connecting the output of said oscillator to said balanced modulator such that the output of said reproducing means is beat by the output of said oscillator means; a squaring circuit means electrically connected to the output of said bandpass filter; an integrator means electrically connected to the output of said squaring circuit; a sample means electrically connected to the output of said integrator and of a character to sample the maximum integrated signal and store on said recorder to which said sample is electrically connected.

5. A system of seismic prospecting which comprises in combination: an oscillator whose frequency of oscillation is given by $f_1+\alpha t$ in which $f_1$ is initial frequency, $t$ is time, and $\alpha$ is the rate of change of the frequency with respect to time; a vibrator for imparting continuous wave vibrations to the ground whose frequency varies from $f_1$ to $f_2$ linearly the same as the frequency of said oscillator; means provided to simultaneously begin said oscillator and said vibrator at $f_1$; means provided so that the output of said oscillator extends in time and independently beyond the output of said vibrator; a seismic transducer means to detect reflections at the surface of the earth of the vibrations from said vibrator; means to beat the output of said oscillator with the output of said transducer means; filter means having a cut-off frequency of $f_1+\alpha t$ to obtain a signal whose frequency is the difference between the signal from said oscillator and signal from said transducer means; and a recording means to add the output from said filter means.

6. A method of seismic prospecting comprising:
   imparting into the earth a first continuous wave of finite duration whose frequency varies linerally;
   generating a second continuous signal whose frequency varies the same as said first continuous wave;
   continuing generating said second continuous wave at the same linear change of frequency beyond said finite duration;
   detecting the reflected signal from said first wave at the surface of the earth; and
   obtaining the difference in frequency between said detected reflection and said second waveform at the time said second reflection is detected.

7. A method of seismic prospecting comprising:
   vibrating the earth surface with a first continuous wave whose frequency sweep is linear with time during a finite duration;
   generating a second continuous wave whose frequency sweep is linear with time and is coincident with the first continuous wave during such finite duration;
   continuing generating said second continuous wave beyond the finite duration of said first continuous wave;
   detecting the reflected waves from said first signal wave at the surface of the earth; and
   obtaining the difference in frequency between said detected reflection and said second wave at the time said reflection is detected.

8. A system of seismic prospecting comprising:
   vibrating means to vibrate the earth surface with a continuous wave having a linear variation in frequency for finite duration;
   generating means for generating a second continuous wave whose frequency is coincident with the first continuous wave during the finite duration, said generating means continuing the second wave in the same linear variation beyond the finite duration;
   detecting means for detecting a reflected signal from said first wave at the surface of the earth; and
   means for determining the difference in frequency between said detector reflected signal and said second wave at the time said reflected wave is detected.

9. An apparatus for obtaining a seismic signal which comprises in combination:
   vibrating means to vibrate the earth with the vibration of the frequency varying linearly from the frequency $f_1$ to the frequency $f_2$;

a balanced modulator whose output signal contains frequencies which are the sum and differences of a carrier signal and a modulating signal fed thereto;

a seismic transducer of a character to detect reflected energy from said vibrator means, the output of said seismic transducer being electrically connected to said balanced modulator;

means connected to said balanced modulator to supply a signal thereto having a frequency the same as the frequency of said vibrator, such means including means for extending the frequency of such signal linearly with time from $f_2$ independently of said vibrating means.

References Cited by the Examiner
UNITED STATES PATENTS

| | | | |
|---|---|---|---|
| 2,156,259 | 5/39 | Blau | 181—0.5 |
| 2,235,089 | 3/41 | Sparks | 181—0.5 |
| 2,521,130 | 9/50 | Scherbatskoy | 181—0.5 |
| 2,794,966 | 6/57 | McCarty | 181—0.5 |
| 2,826,750 | 3/58 | Grannemann | 181—0.5 |
| 2,916,724 | 12/59 | Peterson | 340—15 |
| 2,928,071 | 3/60 | Feagin et al. | 340—15 |

SAMUEL FEINBERG, *Primary Examiner.*

KATHLEEN CLAFFY, LAURENCE V. EFNER,
*Examiners.*